Feb. 3, 1942.     R. L. ATKINSON     2,271,932
CASING, METHOD AND APPARATUS FOR PREPARING SAME
Filed Jan. 25, 1941     4 Sheets-Sheet 1

INVENTOR.
RALPH L. ATKINSON
BY
ATTORNEY.

Feb. 3, 1942.  R. L. ATKINSON  2,271,932
CASING, METHOD AND APPARATUS FOR PREPARING SAME
Filed Jan. 25, 1941  4 Sheets-Sheet 2

INVENTOR.
RALPH L. ATKINSON
BY *Wm. S. Pritchard*
ATTORNEY.

Feb. 3, 1942.   R. L. ATKINSON   2,271,932
CASING, METHOD AND APPARATUS FOR PREPARING SAME
Filed Jan. 25, 1941   4 Sheets-Sheet 3
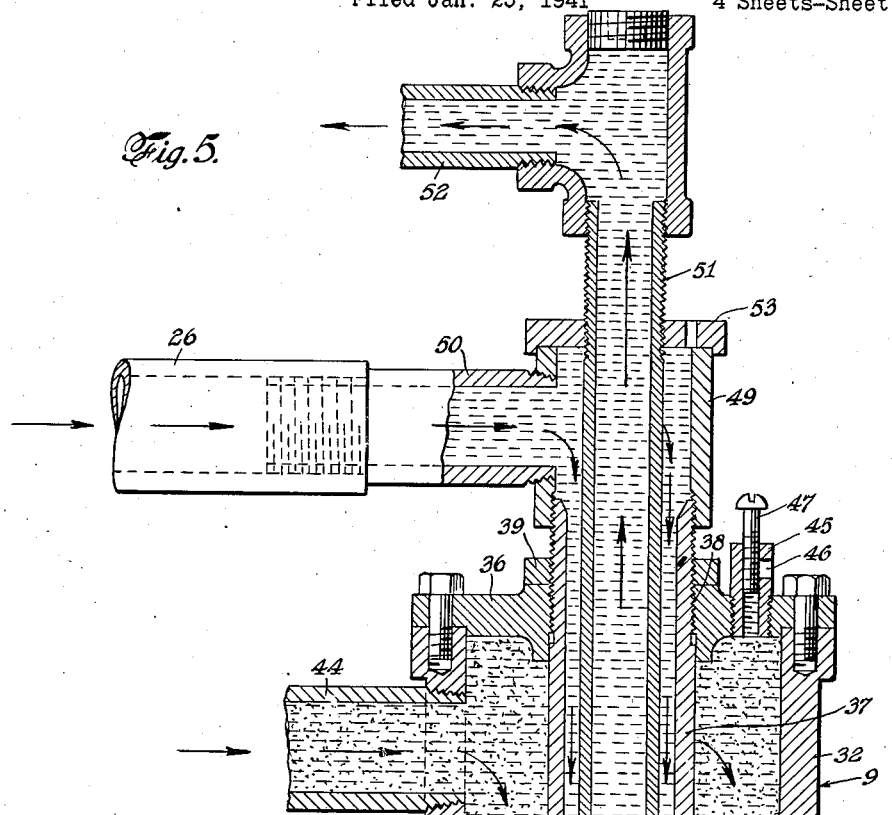
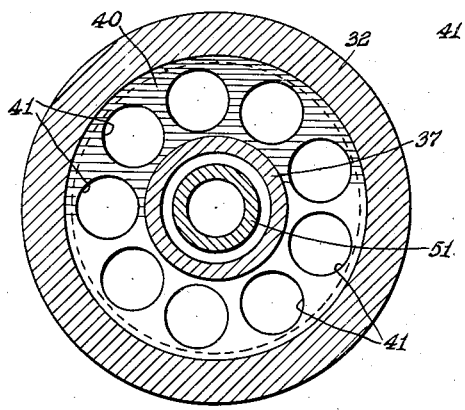
INVENTOR.
RALPH L. ATKINSON
BY
ATTORNEY.

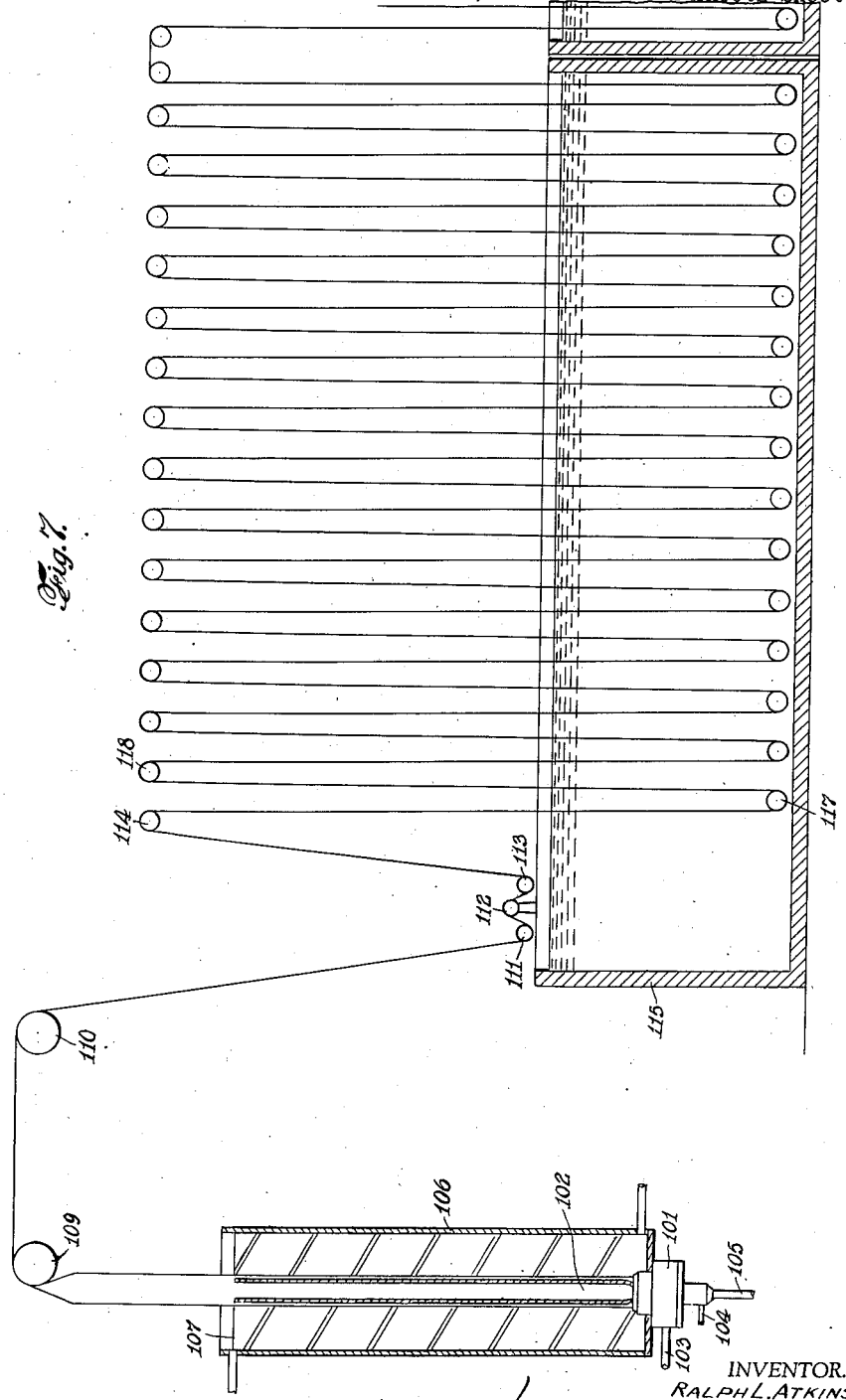

Patented Feb. 3, 1942

2,271,932

UNITED STATES PATENT OFFICE 2,271,932

CASING, METHOD AND APPARATUS FOR PREPARING SAME

Ralph L. Atkinson, Hinsdale, Ill., assignor to Transparent Package Company, Chicago, Ill., a corporation of Illinois Application January 25, 1941, Serial No. 375,913

20 Claims. (Cl. 18—15)

This invention relates to seamless cellulose tubing and to the method of making the same. More particularly, this invention relates to seamless cellulose tubing suitable for use as an artificial casing for meat products, such as sausage, boiled and smoked hams, loaves and the like, and to the process of making the same.

This application is a continuation-in-part of application Serial No. 103,471, filed September 30, 1936, which in turn is a continuation of application Serial No. 746,644, filed October 3, 1934.

In processes for forming sheets, filaments, tubes, and the like, it is and has been common practice to force or extrude a cellulosic solution, such as viscose, through a die of suitable form depending upon the article to be produced and subject the cellulosic solution as extruded to the action of a solution containing ingredients that precipitates the cellulose compound from its solution. Such precipitating solutions are commonly referred to in the cellulose art as "coagulating solutions."

Coagulating solutions may contain chemicals which coagulate cellulosic solutions and simultaneously convert the cellulose compound to cellulose; or they may be free of the ingredients necessary for conversion to cellulose. In the latter case, it is necessary to subject the formed coagulated article to the action of a solution that contains ingredients capable of converting the cellulose compound to cellulose.

When working with solutions of cellulose xanthate, particularly alkaline solutions of sodium cellulose xanthate universally referred to as "viscose" solutions, if the coagulating solution does not contain ingredients capable of converting the cellulose xanthate to cellulose in sufficient quantity to completely convert the cellulose xanthate to cellulose, it is necessary to subject the formed article to the action of a solution that will completely convert the cellulose xanthate to cellulose. Such solutions, capable of converting to cellulose articles consisting wholly or in part of a xanthate of cellulose, are commonly called in the cellulose art, and particularly in the viscose art, "regenerating" solutions. Cellulose articles made from solutions of compounds of cellulose are said to consist of regenerated cellulose, and that part of the manufacture of such articles whereby the cellulose compound is converted to cellulose is known as "regeneration."

In this specification, the term "coagulate" is intended to define the precipitation of a cellulose compound from a solution containing the same.

Also, in this specification, the expression "regenerating" is intended to cover the conversion of a cellulose compound to cellulose to produce articles consisting of regenerated cellulose.

I have discovered that if, in the process of producing a seamless cellulose tubing, the tubing prior to being completely regenerated and preferably after complete coagulation is subjected to a stretching operation, there is produced a product in which the longitudinal strength is not only enhanced but which also is characterized by a high transverse elasticity and the property of stretch or elongation is increased. These properties, and particularly the high transverse elasticity, are of particular value in synthetic casings made from cellulosic materials and in which casings meat products of the type previously mentioned are stuffed. In such casings, longitudinal stretch or elongation is not particularly desirable. In fact, in some cases excessive longitudinal stretch may be distinctly undesirable as it permits the encased meat product, whether a sausage emulsion or a boneless ham, when hanging by one end to slump or sag in the casing, thereby distorting the preferred cylindrical shape. An increase in transverse stretch and transverse elasticity, such as characterizes casings made by the instant invention, is of substantial value, especially when it is taken into consideration that, with reduced longitudinal stretch, increased longitudinal strength and increased transverse stretch there occurs a marked increase in the bursting resistance of the casing walls as measured by the standard Mullen test. These factors are highly important to the meat manufacturer because he is thereby enabled to introduce considerably more meat in a casing of any given size. Since such a casing does not cost the maker any more than a casing of the prior art of equivalent size, it is obvious that the total stuffing cost of the meat product is markedly reduced.

Synthetic casings of the type to which this invention relates, prior to stuffing with the selected meat product, are thoroughly soaked in water and thereafter stuffed. During stuffing, the casings are distended, the expansion varying from as low as 30% to as high as 50% or 60%, the amount of expansion varying with individual local conditions, such as the type and kind of meat used, the type of processing following the stuffing operation, and the desires of the manufacture regarding the weight and shape of his finished product.

Synthetic casings produced by the instant invention, by reason of their increased elasticity, exert more pressure upon their contents than the prior art casings and thereby tend to keep the contents in a more desirable cylindrical shape.

A further advantage of the synthetic casing produced by the instant invention is its ability to expand to a given diameter with the application of less force than is required with casings manufactured by the hitherto known processes. This is of particular importance when stuffing boiled hams or boneless unsmoked hams into the casings. In these cases, the casings are usually expanded 50% or 60% over their original diameter by the force applied to the meat as it is forced through a stuffing horn by the operator. The force or effort is approximately 30% less with the casings of the instant invention. Since the effort of stuffing is lessened, the operator's efficiency is increased.

In the process of making artificial silk fibers from cellulosic material, it has been proposed to provide a stretching or drawing action at some stage in the process of making the fibers, whereby the filament is stretched for the purpose of reducing the cross-section and increasing the strength of the final filament. These results are not suggestive of the above referred to properties which characterize the casings of the instant invention.

In accordance with the principles of this invention, a cellulosic solution is extruded through an annular nozzle and, after the solution has been sufficiently coagulated to produce a seamless tubing of the cellulosic material capable of maintaining its coagulated shape during further processing and while being continuously advanced, as over rollers, and before complete regeneration of the cellulosic material to cellulose, subjecting the coagulated tubing to a longitudinal stretch, and thereafter subjecting the stretched tubing to the action of a regenerating bath or solution. After regeneration, the tubing may be washed and dried in the known manners. Thereafter, the tubing is cut into the desired lengths to constitute the casing.

As previously indicated, an essential feature of the invention resides in stretching longitudinally a seamless tubing of cellulosic material after the cellulosic solution has been sufficiently coagulated to maintain its coagulated shape while being continuously advanced over rolls but before complete regeneration of the cellulosic material to cellulose. The greatest improvements to the casing are obtained when the stretching of the tubing is carried out before any substantial amount of regeneration has taken place, and accordingly this embodiment constitutes the preferred form of the invention. In the preferred form of the invention, the longitudinal stretch is applied after substantially complete coagulation and before any substantial amount of regeneration has taken place. Improvements to the casing are obtained to a lesser degree if the longitudinal stretching of the tubing is effected after the tubing has been coagulated and partially, though not completely, regenerated.

The stretching of the tubing prior to complete regeneration may be effected in any desired and appropriate manner. In the preferred form of the instant invention, the stretching of the tubing is effected by means of rolls having different peripheral speeds in accordance with the desired amount of stretch. The rolls may be arranged so that the tubing passes therebetween in a longitudinal direction or may be arranged so that the tubing passes between the rollers in a vertical direction.

The degree of longitudinal stretching contemplated by the instant invention may be from 5% to 70% of the tubing while the latter is in the coagulated or coagulated and partially regenerated state. Casings obtained from tubing which has been stretched from 15% to 30%, as herein described, are highly satisfactory for most applications.

The invention is particularly adapted to be utilized in combination with the extrusion devices to provide a continuous process for producing the tubing. The extrusion device may be of the type which extrudes downwardly or upwardly, as desired.

In order to more fully explain the nature of the invention and the manner in which it may be carried out, reference will now be had to the accompanying drawings forming a part of this specification and in which:

Figure 5 is a vertical central section through the forming head for forming the tubing;

Figure 6 is a horizontal section on the line 6—6 of Figure 5, looking downward; and Figure 7 is a diagrammatic side view, partly in section, of another form of apparatus for practicing my invention.

Figure 1:
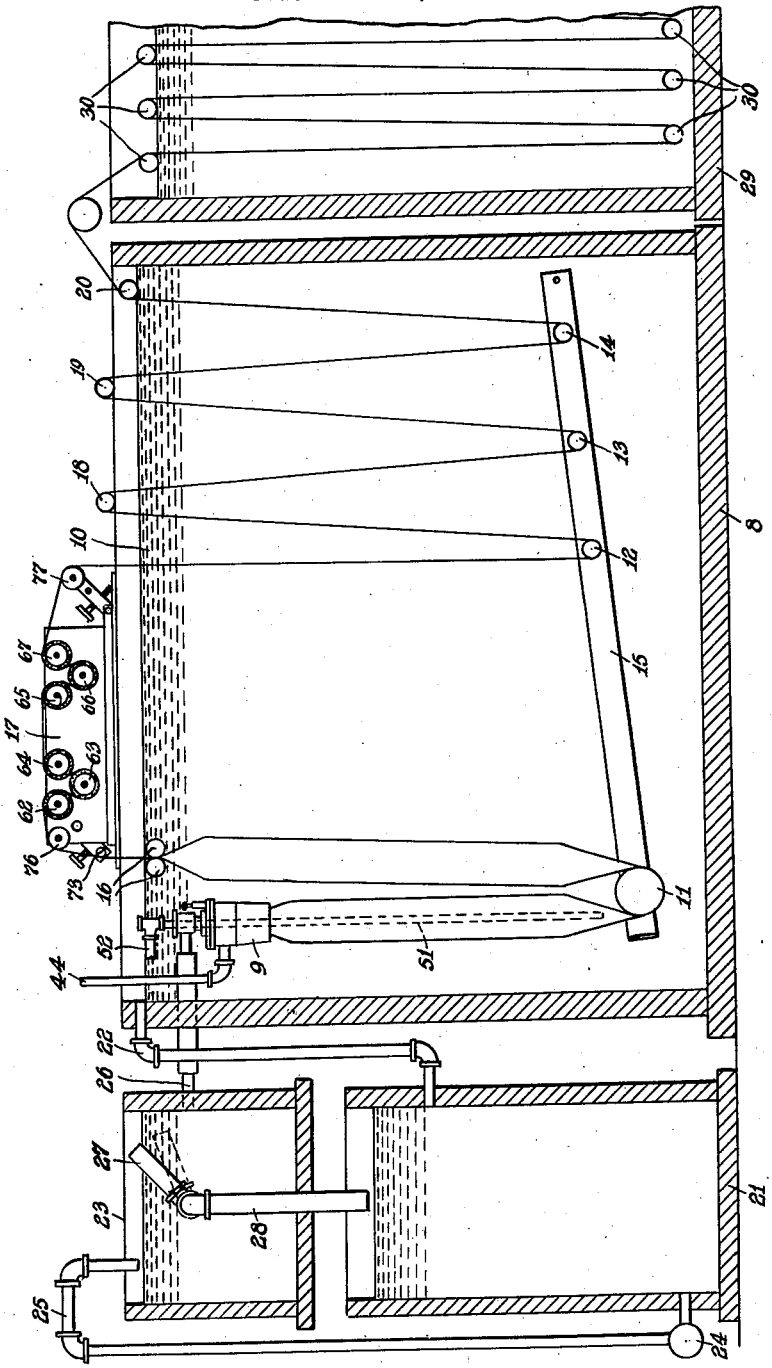
Figure 1 is a side view, partly in section, of an apparatus for practicing my invention.

Referring first to Figure 1 of the drawings, there is shown at 8 a tank in which the forming head 9 is submerged, when in use, in a bath 10 of coagulating liquid. The tank also contains guide rollers 11, 12, 13 and 14 suitably mounted in a frame 15 and a pair of guiding and flattening rolls 16 at about the level of the bath. Above the bath is mounted a set of stretching rolls 17, which will be more fully described hereafter, and guide rolls 18, 19 and 20. An overflow tank 21 receives coagulant through a pipe 22 which preserves the level of the coagulant in the tank 8. A supply tank 23 receives coagulant from the tank 21 through the pump 24 and pipe 25 and supplies coagulant to the forming head 9 through a pipe 26. The level of the coagulant in the tank 23 is maintained by an adjustable overflow pipe 27 connected to a fixed pipe 28 leading to the tank 21. At 29 is shown a tank containing regenerating fluid, and it is provided with a series of guide rolls 30 for guiding the tubing through the bath.

Referring more particularly to Figures 5 and 6, in connection with Figure 1, the forming head will now be described. A die member or head 32 encloses a generally cylindrical chamber, the lower portion of which is tapered downwardly as at 33, and open at the bottom, as at 34, save for the inner die member or mandrel 35. The mandrel 35 is correspondingly tapered and vertically adjustable in order to regulate the annular passage between the mandrel and die, to thereby regulate the wall thickness of the tube as extruded. The die member 32 is closed at its upper end by a cover plate 36 secured to the body thereof, and the sleeve 37 of the inner die member or mandrel is threaded and screwed into a central opening in the cover plate as at 38, to permit adjustment of the mandrel relative to the die memb by turning the former. A lock nut 39 secures the mandrel in adjusted position. The mandrel is maintained in its position coaxial with the die member by a perforated plate 40, shown as formed integral with the mandrel, the openings 41 in said plate providing for the uninterrupted flow of the viscose or other cellulosic solution downward through the chamber of the die member 32. The cellulosic solution is supplied to the upper end of the chamber of the die member or head through a pipe 44 connected to suitable pressure means for delivering the viscose or other cellulosic solution to the die chamber. At 45 I have shown an internally threaded sleeve opening into the chamber, provided with a side outlet 46 and a screw plug 47 which may be manipulated to release air or gas which may be trapped in the upper end of the chamber. A coupling 49 is secured to the upper end of the mandrel sleeve 37 and connected by a side pipe 50 with the previously mentioned pipe 26 leading from the supply tank, coagulating liquid thus being fed continuously and under regulated pressure to the interior of the mandrel sleeve. An exhaust pipe 51 for receiving coagulant from the interior of the formed tubing extends centrally through the mandrel sleeve 37 downwardly a substantial distance and may discharge through the side connection 52 into either of the previously mentioned tanks. The discharge pipe 51 is threaded through the cap 53 of the coupling 49 and may therefore be adjusted vertically as desired.

By suitably adjusting the pipe 51 and the sleeve overflow 27, the pressure of the coagulating liquid within the forming head and the cellulosic tubing can be adjusted as desired.

From the foregoing description the operation of the apparatus thus far described will be apparent. The viscose solution is forced under pressure to the forming head and is extruded through the annular die, thus forming the cellulosic tubing. The lower end of the forming head being beneath the surface of the coagulating liquid in the tank, the tube as it is formed is at once subjected on its outer surface to the coagulating effect of the bath, and also is subjected in its inner face to the coagulating liquid introduced through the head. From the forming head the tubing passes directly downward and about the guiding roll 11 and then upward and between the rolls 16. These rolls are so spaced as to flatten, but to exert but little pressure upon the tubing. The coagulating solution flows from the supply tank 23 through the hollow mandrel to the interior of the tubing and then back through the outlet pipe 51. The tubing passes sufficiently loosely about the guide roller 11 so that the internally supplied coagulating medium will pass through the tubing into the upwardly moving portion of the latter between the guide roller 11 and the roller 16. Thus, the tubing remains distended between the forming head and the rolls 16, save that it is more or less flattened in passing around the rolls 11, and the pressure of the coagulating fluid within the tubing is so adjusted as to be slightly in excess of that within the tank 8 and to prevent the collapse of the tube under the pressure of the liquid in the tank 8. Preferably, the pressure of the liquid within the tube is maintained sufficiently in excess of that in the tank 8 so that the tubing is slightly distended from the forming head to the rolls 16. The construction and operation thus far described are not substantially different from the construction and operation of the apparatus disclosed in my earlier application Serial No. 668,712, filed June 1, 1933.

Figure 2:
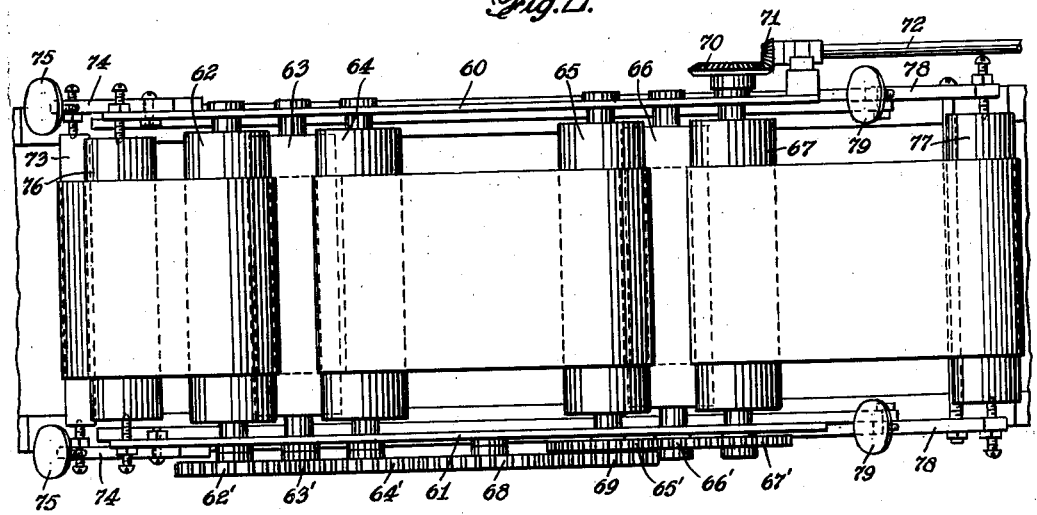
Figure 2 is a plan view of a portion thereof.
Figure 3:
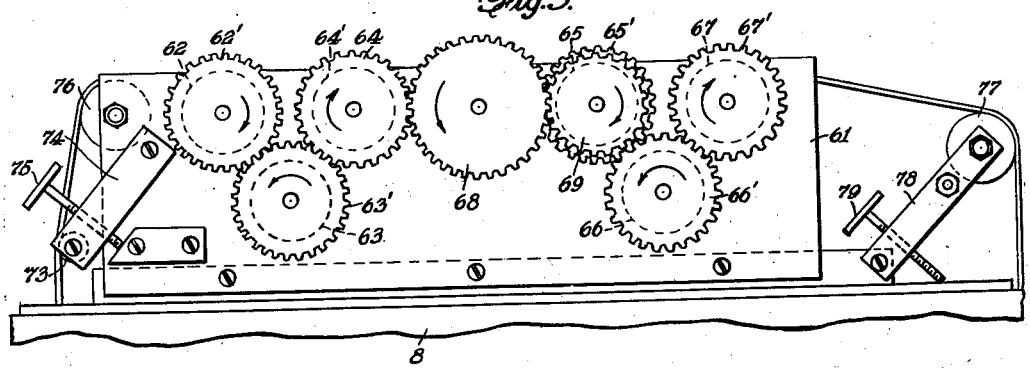
Figure 3 is a side elevation of the portion of the apparatus shown in Figure 2.
Figure 4:
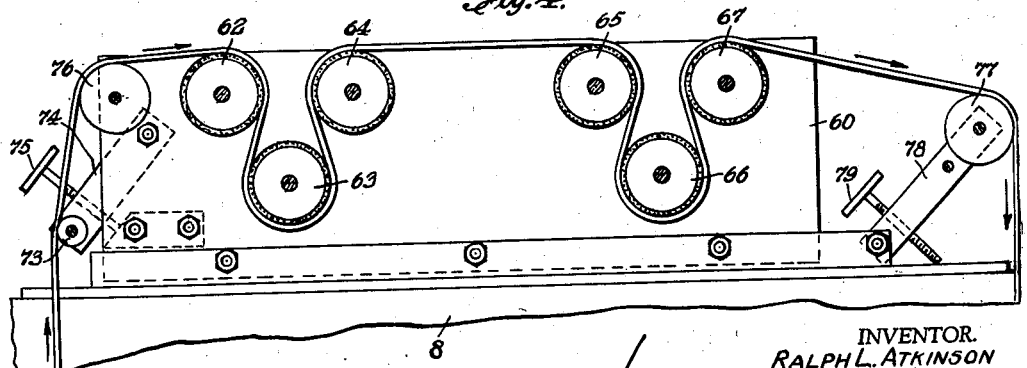
Figure 4 is a vertical section of the same.

The improvement to which the present invention relates as applied to this apparatus and process consists in the provision of means for stretching the tubing after coagulation and before the complete regeneration of the cellulose. For this purpose I have interposed between the rolls 16 and the rolls for guiding the tubing in its further travel through the coagulating bath a set of guiding and stretching rolls indicated at 17. Referring more particularly to Figures 2, 3 and 4, it will be noted that in this particular embodiment of the invention I have employed two groups of three rolls each, the rolls of the second group being driven at somewhat greater speed than those of the first group, by a mechanism to be now described, thus resulting in the tubing being stretched between the two groups of rolls. The mounting for the rolls, as specifically illustrated, consists of a pair of bearing plates 60, 61 which, as shown, are mounted upon the opposite walls of the tank 8. The stretching rolls 62, 63, 64, 65, 66 and 67 are journaled in these plates and their journals at one side extend beyond the plate and are provided with gear wheels 62', 63', 64', 65', 66', 67'. Gears 62', 63' and 64' are of equal size and intermesh, and therefore the rolls 62, 63, 64 are driven at the same speed. Likewise, gears 65', 66' and 67' are of the same size and driven at the same speed. An idler gear 68 is interposed between gear 64' and a somewhat smaller gear 69 on the shaft of the roll 65. The gear ratio is at 8:7 in this particular device though, of course, it may be varied in accordance with the amount of stretch desired. On the other end of the shaft of roll 67 is a bevel pinion 70 in mesh with a gear 71 on a shaft 72 for driving the rolls from a suitable source of power.

The rolls are covered with smooth felt or the like to give proper friction engagement with the tubing to effect the desired stretching. At the end of the frame of the stretcher rolls adjacent the rolls 16, a guide roll 73 is mounted between swinging arms 74 which may be independently adjusted by means of set screws 75 for properly guiding the tubing, and above this construction is another guide roll 76 over which the tubing passes to the first group of stretching rolls after leaving the adjustable guide roller. At the other end of the stretching device a guide roller 77 is mounted upon swinging arms 78, the position of which may be independently adjusted by set screws 79. From the roll 77 the tubing again enters the coagulating bath, passing about the guide rolls 12, 18, 13, etc., for the further action of the coagulating bath upon the cellulosic material after the stretching operation.

Thus, the tubing, after extrusion from the forming head, is given an interior and exterior treatment with the coagulating solution, is then stretched between the two groups of stretching rolls and, thereafter, is given the finishing, regenerating treatment. The extent of treatment with the coagulating bath before the stretching operation depends in part upon the wall thickness of the tubing, the ripeness of the viscose, and the concentration and character of the coagulating bath employed. It is sufficient if the viscose is coagulated to an extent which will render it reasonably firm but not interfere with the effectiveness of the stretching operation.

EXAMPLE 1.—With a very ripe viscose, i. e. salt index of 0.50 to 1.00, I have produced tubing of the wall thickness of approximately .025 of an inch, as it comes from the forming head, and caused it to travel at such a rate and through a path of such length that it was exposed to the coagulant, an aqueous solution containing 10% to 12% ammonium sulfate, about 8% sodium sulfate and about 2.5% sulfuric acid for a period of about 35 seconds before being subjected to the stretching operation. After the stretching operation, regeneration of the cellulose is effected by its passage through the tank 29, which may contain a 5% solution of sulphuric acid.

It is to be noted that, due to the speed of travel of the tubing through the coagulating bath in the tank 8, both before and after stretching, very little, if any, regeneration is effected.

If desired, the tubing, after stretching, need not be further subjected to the coagulating solution, i. e. returned to the tank 8 containing the coagulating solution, as hereinbefore described, but may be introduced directly into the tank 29 containing the regenerating solution. When this procedure is utilized, the size of the tank 8 is appropriately modified so as to permit the tubing, after stretching, to be guided, as for example, by the roll 77 to the tank 29 containing the regenerating solution.

By the stretching operation, the tubing, in addition to being lengthened about 15%, is reduced peripherally to some extent, its lengthwise stretch considerably increased, its transverse strength slightly diminished, and its transverse stretch and elasticity, in wet condition, materially enhanced.

Referring now to Figure 7, where there is shown an embodiment of my invention as utilized in conjunction with an upward extrusion machine, the reference numeral 101 designates an upward extrusion die equipped with a mandrel 102 which is securely clamped in a tank 106 filled with coagulating liquid 107. The details of construction of the die and mandrel form no essential part of this invention and, therefore, they will not be described in detail. Suffice it here to state that the viscose is introduced into the die 101 through the inlet 103 and the coagulating liquid is introduced into the die 101 through the inlet 104, the coagulating liquid passing upwardly between the inside of the extruded tubing and the outside of the mandrel 102 and down through the inside of the mandrel, leaving the die through the outlet 105.

The extent of treatment with the coagulating bath before the stretching operation depends in part upon the wall thickness of the tubing, the ripeness of the viscose, and the concentration and character of the coagulating bath employed. As in the case of downward extrusion, it is sufficient if the viscose is coagulated to an extent which will render the tubing reasonably firm but not interfere with the effectiveness of the stretching operation.

In accordance with this embodiment of the invention, after the extruded tubing has been coagulated, as hereinafter described, it is subjected to a longitudinal stretching and then thereafter is subjected to the action of a regenerating bath, whereby cellulose xanthate is converted to cellulose. The means for stretching the tubing may be of any convenient type. For example, it may be of the type described in connection with the embodiment of the invention shown in Figures 1, 2, 3 and 4. However, in the form shown, the stretching is effected by means hereinafter more fully described.

In the embodiment of the invention illustrated in Figure 7, the stretching of the tubing is effected between rolls 113 and 114 and thereafter the stretched coagulated tubing is caused to pass through the tank 115 containing the regenerating solution until the tubing has been converted to cellulose. It is to be noted that both the rolls 113 and 114 are located adjacent to and above the tank 115.

In the form shown, the coagulated tubing, after it issues from the coagulating bath, is caused to travel around the guide rollers 109 and 110 and thence around rollers 111 and 112, the latter two rollers serving to maintain the stretching effect between the rolls 113 and 114. The tubing, after stretching, is caused to pass through the tank containing the regenerating solution in any desired manner. However, in the form shown, the stretched tubing passes from the roller 114 to the roller 117 beneath the level of the regenerating liquid, and preferably near the bottom thereof, and thence to the roller 118, which is mounted at the same level as the roller 114 and at a convenient distance above the level of the tank of regenerating liquid. The tubing is immersed in the regenerating liquid several times while advancing over and under rollers similar to the rollers 117 and 118 until the desired degree of regeneration has been achieved. Though in the drawings the tubing is shown as being given 15 immersions and passes through the regenerating liquid, the invention is not restricted thereto. The exact number of immersions in the regenerating liquid may vary, depending upon the ripeness of the viscose, the desired degree of regeneration, the thickness of the tubing, the speed with which it is conveyed, and the nature of the regenerating bath.

The rollers, with the exception of those submerged in the solution and adjacent the bottom of the tank 115, are connected to a source of power by a suitable system of shafting and gearing (not shown). The gearing is arranged so that the peripheral speed of the roller 113 is less than the peripheral speed of the roller 114. The gearing is further arranged so that each of the rollers 109, 110, 111 and 112 has a peripheral speed equal to that of the roller 113. Similarly, the gearing is arranged so that each of the upper rollers 118, etc. has a peripheral speed equal to that of the roller 114. Satisfactory results have been secured when the peripheral speed of the rollers 113 and 114 is 12 feet per minute and 14 feet per minute, respectively. The rollers in the bottom of the tank 115 may be driven at the same speed as the corresponding upper rollers 114, 118, etc., or they may be allowed to idle on suitable bearings, in which case they are rotated by the tubing as it passes thereover.

EXAMPLE 2.—*Upward extrusion*

The coagulating liquid 107 is an aqueous solution consisting of:

| | Per cent by weight |
|---|---|
| Ammonium sulphate | 15 |
| Sodium sulphate | 12 |
| Sulphuric acid | 2½ |

The regenerating solution consists of water containing 5% of sulphuric acid.

The viscose solution has a salt index of 0.75.

The wall thickness of the final casing is .0032 of an inch.

In this example, about 1½ minutes are required for the tubing to travel from the lips of the die to the roller 113. At this point, the tubing shows no evidence of regeneration, as it is transparent, deep brown in color, and has a strong odor of free ammonia. It dissolves to a clear solution in 5% caustic soda with no undissolved particles. If there were any regenerated cellulose present at this stage, it would appear as insoluble particles in the solution. As a result of the stretching between the rollers 113 and 114, the tubing shrinks transversely approximately 9% and the wall thickness shrinks approximately 5½%. Evidence of regeneration appears shortly after the tubing begins its travel through the regenerating liquid. It changes in color from transparent brown to opaque white, the opaqueness being due to particles of amorphous sulphur deposited in the film as a result of the destruction of the xanthate radical by the sulphuric acid. The tubing becomes inflated with gases liberated during the regeneration, chief of which is hydrogen sulphide and carbon bisulphide. These gases are caused to pass from the tubing in the manner known in the art. During its course through the regenerating liquid, the tubing shrinks in width approximately 25% and the wall thickness shrinks approximately 32%. Though there is no evidence of any regeneration in the tubing by the action of the coagulating bath, the sulphuric acid thereof is neutralized to some extent during the process and the coagulating bath must be replenished from time to time with both sulphuric acid and ammonium sulphate. Lacking evidence of regeneration, it must be assumed that the sulphuric acid is consumed by the free, uncombined alkali in the viscose and by the ammonia that is liberated by the interaction of the caustic soda and ammonium sulphate.

If desired, the sulphuric acid could be omitted from the coagulating bath by suitably adjusting the factors involved, such as the relationship between the amount of coagulating salts in the coagulating bath and the ratio of alkali to cellulose in the viscose and the degree of ripeness of the viscose solution. I prefer not to use a neutral coagulating bath, i. e. one free of sulphuric acid, since sulphuric acid prevents to a great extent loss of ammonia and it is, therefore, more economical to use a coagulating bath slightly acid with sulphuric acid than to use a neutral bath free of sulphuric acid.

EXAMPLE 3.—*Upward extrusion*

The process illustrated in this example may be used where economy or simplicity in plant equipment or where part of the improvements that can be made in the casing are desired.

The coagulating liquid 107 is an aqueous solution consisting of:

| | Per cent by weight |
|---|---|
| Sulphuric acid | 6–12 (preferably 10) |
| Sodium sulphate | 12–18 (preferably 16) |

The regenerating solution consists of water containing 5% of sulphuric acid.

The viscose solution has a salt index of 0.75.

The wall thickness of the final casing is .0032 of an inch.

Utilizing a coagulating bath as set forth in this example and the speeds described under Example 2, the casing as it emerges from the coagulating bath is light brown in color and semi-opaque. A sample of the tubing taken near the roll 111 is insoluble in 5% caustic soda solution but, upon immersion for approximately 1 or 2 minutes, becomes a gelatinous mass that has no film strength but forms a ball on the end of a stirring rod and cannot be spread out again as a film. If a sample of the tubing is taken from the same place and covered with water, it regenerates in the course of approximately 8 to 10 minutes and can be washed and treated in 5% caustic soda without any deleterious effect. When washed free from caustic soda, the tubing exhibits good film strength and normal casing properties. These two tests indicate that the tubing at the roll 111, at which stage the tubing has been subjected to a 10% sulphuric acid for about 1½ minutes before stretching, is partially but not wholly regenerated. The tubing contains sufficient acid at the roll 111 to completely regenerate it, but a time interval of about 10 minutes is required for complete regeneration after the tubing reaches the point where the stretch is applied.

During the stretching operation, the tubing shrinks approximately 7% in width and approximately 6% in wall thickness. After stretching and while undergoing the complete regenerating treatment, the tubing shrinks approximately 18% in width and approximately 21% in wall thickness. Comparing these data with that obtained in Example 2, it seems to be a reasonable assumption that the tubing in the present case is approximately 35% regenerated when it is stretched.

The following table shows a comparison in physical characteristics between various types of casing. Casings #1–#4 are made by the process described in Example 2, the speeds of the rolls 113 and 114 being adjusted to give the desired percentage of stretch. Casing #5 is made by the process described in Example 3. Casing #6 is made by the process described in Example 3 with the exception that all rolls are rotating at the same peripheral speed, that is, the hitherto known processes are used exclusively, there being no stretch applied to the tubing between coagulation and complete regeneration.

| Casing | Stretch | Dry wall thickness | Strength | | Elongation | | Mullen bursting test | Percent elasticity | Expansion diameter at bursting point | Pressure required to expand to 50% over original diameter |
|---|---|---|---|---|---|---|---|---|---|---|
| | | | Transversely | Longitudinally | Transversely | Longitudinally | | | | |
| | Percent | Inches | Pounds | Pounds | Percent | Percent | Pounds per square inch | | Percent | Pounds per square inch |
| 1 | 10 | .0032 | 17 | 43 | 160 | 40 | 43.5 | 73 | 110 | 1.85 |
| 2 | 20 | .0032 | 15 | 44 | 162 | 28 | 45 | 75 | 110 | 1.85 |
| 3 | 30 | .0032 | 15 | 46 | 165 | 25 | 49 | 75 | 120 | 1.85 |
| 4 | 40 | .0032 | 14 | 55 | 175 | 20 | 60 | 75 | 135 | 1.85 |
| 5 | 20 | .0032 | 17.0 | 31.6 | 145 | 45 | 39 | 67 | 100 | 1.85 |
| 6 | 0 | .0032 | 17.4 | 26 | 130 | 55 | 37 | 57 | 87 | 2.35 |

The value # given for strength in pounds is obtained by cutting strips from dry casing 1½ inches wide by 6 inches long. The strips are then thoroughly soaked in water, then clamped in jaws 2½ inches apart. The bottom face of the jaws is 3 inches wide and 1 inch deep, and the top face is 1 inch square. The strips are placed in the jaw so that the overlap of the strip with respect to the top face of the jaw is equal on both sides. This prevents the casing from being caught on the corners of the jaws as it is stretched out to break, which happens if the strip and jaws are of equal width. The jaws are moved apart until the strip breaks, whereupon the force in pounds required to break is read from a calibrated dial.

Elongation in percent is—

$$\frac{\text{Length at breakpoint} - \text{original length}}{\text{Original length}} \times 100$$

The value for the Mullen bursting test is obtained on wet casing with a standard Mullen tester.

The values in the table were obtained on casings approximately 4 inches in diameter when wet and 20 inches long, or pieces of the necessary size cut from said casings. The value for percent elasticity is obtained as follows:

(1) The casing is inflated 50% over its original wet diameter by means of compressed air.
(2) Air is allowed to escape and the width of the deflated casing measured.

% Elasticity =

$$\frac{\text{Inflated diameter} - \text{deflated diameter}}{\text{Inflated diameter} - \text{original diameter}} \times 100$$

For example, the original casing is 6¼" wide which corresponds to 3.98" in diameter; it is inflated to a diameter of 5.97". Air is released and the casing assumes a width of 7⅛" corresponding to a diameter of 4.53".

$$\% \text{ Elasticity} = \frac{5.97 - 4.53}{5.97 - 3.98} \times 100 = 72.3\%$$

Percent expansion in diameter at bursting point is obtained by inflating a casing with compressed air until it bursts, noting the diameter at the bursting point for comparison with the original diameter.

Pressure required to expand to 50% over the original diameter is obtained by inflating with compressed air a casing to a point 50% over its original diameter, then noting on a mercury column the air pressure required, this value being converted to pounds per square inch for simplicity.

Though the invention has been described with particular reference to viscose, it is to be understood that the invention is not restricted thereto. The principles of this invention are equally applicable to processes utilizing suitable film-forming cellulose derivatives, such as cellulose esters, for example, cellulose nitrate, cellulose acetate, cellulose formate, cellulose butyrate, etc., cellulose xanthate and cellulose ether xanthates, cellulose thiourethanes, fatty acids, and other water-swelling cellulose derivatives, such as alkali-soluble cellulose ethers and glycollic acid ethers of cellulose, and their salts, all of which cellulose derivatives are capable of being coagulated and converted to cellulose hydrate or of being converted to a derivative of lower degree of substitution or a different derivative by well-known treatments, such as saponification, de-esterification, de-etherification, decomposition, and the like.

It is further to be understood that, though in the preferred embodiment of the invention complete conversion of the cellulose derivative to cellulose is desired, the invention is not restricted thereto, since any desired degree of conversion to cellulose may be obtained.

Since it is obvious that various changes and modifications may be made in the above description without departing from the nature or spirit thereof, this invention is not restricted thereto except as set forth in the appended claims.

I claim:

1. An apparatus for preparing seamless cellulose tubing which comprises a coagulating bath, means to extrude in the shape of a tubing a solution of a coagulable and convertible cellulose compound into said coagulating bath, a regenerating bath, means interposed between said coagulating bath and said regenerating bath to apply a longitudinal stretch to said tubing prior to the passage of said tubing into said regenerating bath, and means to continuously and successively pass said tubing through said coagulating bath, said stretching means and said regenerating bath.

2. An apparatus for preparing seamless cellulose tubing which comprises a coagulating bath, means to extrude in the shape of a tubing a solution of a coagulable and convertible cellulose compound into said coagulating bath, a regenerating bath, means interposed between said coagulating bath and said regenerating bath to apply a longitudinal stretch to said tubing prior to the passage of said tubing into said regenerating bath, and means to continuously and successively pass said tubing through said coagulating bath, said stretching means and said regenerating bath, said stretching means comprising a pair of spaced rollers having different peripheral speeds to effect the stretching of the tubing passing therebetween.

3. A process of producing a thin-walled seamless cellulose tubing comprising shaping a solution of a coagulable and convertible cellulose derivative into the form of a tubing, coagulating said tubing, stretching said coagulated tubing longitudinally, and subsequently subjecting said stretched tubing to the action of a regenerating solution for a sufficient time to effect the desired degree of conversion.

4. A method of producing a thin-walled seamless cellulose tubing comprising shaping a solution of a coagulable and convertible cellulose derivative into the form of a tubing, completely coagulating said tubing, stretching said completely coagulated tubing longitudinally, and subsequently subjecting said stretched tubing to the action of a regenerating solution for a sufficient time to effect the desired degree of conversion.

5. A process of producing a thin-walled seamless cellulose tubing comprising shaping a solution of a coagulable and convertible cellulose derivative into the form of a tubing, coagulating and partially converting said tubing, stretching said coagulated and partially converted tubing longitudinally, and subsequently subjecting said stretched tubing to the action of a regenerating solution for a sufficient time to effect the desired degree of conversion.

6. A process of producing a thin-walled seamless cellulose tubing comprising extruding in the shape of a tubing a solution of a coagulable and convertible cellulose derivative into a coagulating bath whereby said tubing is coagulated, stretching said coagulated tubing longitudinally, and subsequently subjecting said stretched tubing to the action of a regenerating solution for a sufficient time to effect the desired degree of conversion.

7. A method of producing a thin-walled seamless cellulose tubing comprising extruding in the shape of a tubing a solution of a coagulable and convertible cellulose derivative into a coagulating bath to completely coagulate said tubing, stretching said completely coagulated tubing longitudinally, and subsequently subjecting said stretched tubing to the action of a regenerating solution for a sufficient time to effect the desired degree of conversion.

8. A process of producing a thin-walled seamless cellulose tubing comprising extruding in the shape of a tubing a solution of a coagulable and convertible cellulose derivative into a bath to coagulate and partially convert said tubing, stretching said coagulated and partially converted tubing longitudinally, and subsequently subjecting said stretched tubing to the action of a regenerating solution for a sufficient time to effect the desired degree of conversion.

9. A process of producing a thin-walled seamless cellulose tubing comprising extruding in the shape of a tubing a viscose solution into a coagulating bath whereby said tubing is coagulated, stretching said coagulated tubing longitudinally, and subsequently subjecting said stretched tubing to the action of a regenerating solution for a sufficient time to effect complete conversion.

10. A method of producing a thin-walled seamless cellulose tubing comprising extruding in the shape of a tubing a viscose solution into a coagulating bath to completely coagulate said tubing, stretching said completely coagulated tubing longitudinally, and subsequently subjecting said stretched tubing to the action of a regenerating solution for a sufficient time to effect complete conversion.

11. A process of producing a thin-walled seamless cellulose tubing comprising extruding in the shape of a tubing a viscose solution into a bath to coagulate and partially convert said tubing, stretching said coagulated and partially converted tubing longitudinally, and subsequently subjecting said stretched tubing to the action of a regenerating solution for a sufficient time to effect complete conversion.

12. In the process of producing thin-walled seamless cellulose tubing from a solution of a coagulable and convertible cellulose derivative, the step which comprises subjecting the tubing to a longitudinal stretch of from 10% to 70% prior to effecting the desired final degree of conversion.

13. In the process of producing thin-walled seamless cellulose tubing from a solution of a coagulable and convertible cellulose derivative, the step which comprises subjecting the tubing to a longitudinal stretch of from 15% to 30% prior to effecting the desired final degree of conversion.

14. An artificial casing for meat products formed of cellulose converted from a cellulose derivative and having an increased transverse stretch during stuffing resulting from longitudinal stretching prior to the final conversion to cellulose.

15. An artificial casing for meat products formed of cellulose converted from a cellulose xanthate and having an increased transverse stretch during stuffing resulting from longitudinal stretching prior to complete conversion to cellulose.

16. An artificial casing for meat products formed of cellulose converted from a cellulose derivative and having a percentage of elasticity in excess of 60%.

17. A process of producing a thin-walled seamless cellulose tubing comprising shaping a solution of a coagulable and convertible cellulose derivative into the form of a tubing, coagulating said tubing, stretching said coagulated tubing longitudinally prior to any conversion of said cellulose derivative to cellulose, and subsequently subjecting said stretched tubing to the action of a regenerating solution to convert the tubing to cellulose.

18. A method of producing a thin-walled seamless cellulose tubing comprising shaping a solution of a coagulable and convertible cellulose derivative into the form of a tubing, completely coagulating said tubing, stretching said completely coagulated tubing longitudinally prior to any conversion of said cellulose derivative to cellulose, and subsequently subjecting the stretched tubing to the action of a regenerating solution to convert the tubing to cellulose.

19. A process of producing a thin-walled seamless cellulose tubing comprising extruding in the shape of a tubing a viscose solution into a coagulating bath whereby the tubing is coagulated, stretching said coagulated tubing longitudinally prior to any conversion of said viscose to cellulose, and subsequently subjecting the stretched tubing to the action of a regenerating solution to convert the tubing to cellulose.

20. A method of producing a thin-walled seamless cellulose tubing comprising extruding in the shape of a tubing a viscose solution into a coagulating bath whereby said tubing is coagulated, subjecting said coagulated tubing to a longitudinal stretch of about 15% prior to any conversion of the viscose to cellulose, and subsequently subjecting said stretched tubing to the action of a regenerating solution to convert the tubing to cellulose.

RALPH L. ATKINSON.